United States Patent Office 3,542,814
Patented Nov. 24, 1970

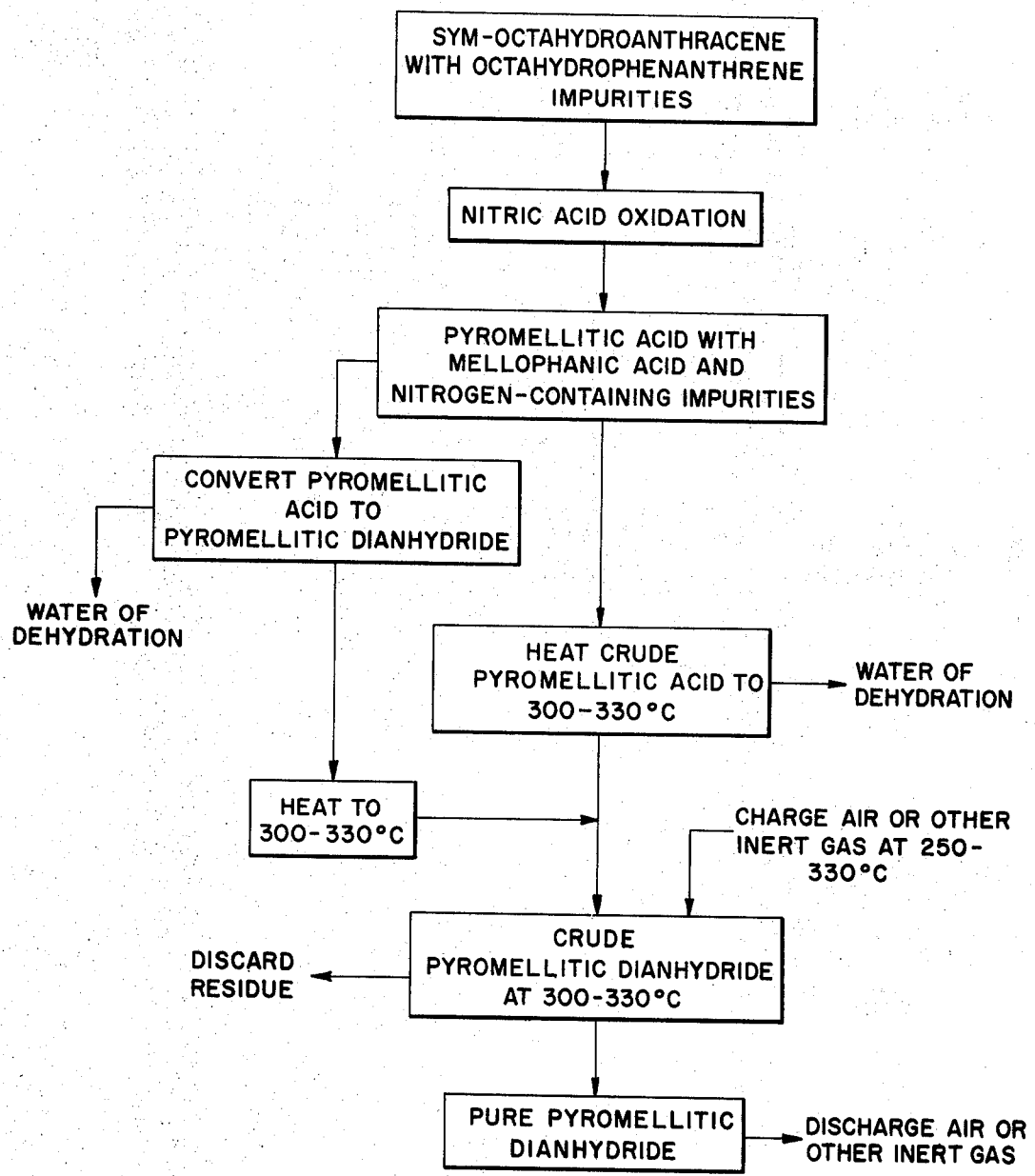

3,542,814
PYROMELLITIC DIANHYDRIDE PURIFICATION
Nicholas P. Greco, Pittsburgh, Pa., assignor to Koppers Company, Inc., a corporation of Delaware
Filed July 12, 1968, Ser. No. 744,559
Int. Cl. C07c 63/32
U.S. Cl. 260—346.3        8 Claims

ABSTRACT OF THE DISCLOSURE

Pyromellitic dianhydride, prepared from nitric acid oxidation of sym-octahydroanthracene and having nitrogen-containing impurities and mellophanic acid or anhydried there is purified by contact in a closed reaction zone, in a liquid state, with a flow of air or inert gas at a temperature of 300–330° C. and collection of the dianhydride in a porous container.

BACKGROUND OF THE INVENTION

Pyromellitic dianhydride is a useful component for the preparation of high-temperature-resistant polymers. Such polymers are formed by the reaction of the dianhydride with diamines to form polyamides or by reaction of the dianhydride with tetraamines. In addition, pyromellitic dianhydride is an excellent curing agent for epoxy compositions. In order to form the high temperature-resistant polymers it is imperative that dianhydride of high purity be used. Impure dianhydride will form discolored polymer products and the impurities can interfere with the polymerization. In particular, certain impurities such as nitrogen derivatives or trace metals are particularly harmful when attempting to obtain proper molecular weight polypyromellitimides. Also, mellophanic dianhydride or acid present in pyromellitic dianhydride monomer, can adversely affect the final properties of the polypyromellitimides.

Numerous methods have been proposed for purification of pyromellitic dianhydride, such as the use of solvent systems which form complexes with the dianhydride, as taught in U.S. 3,344,152, or the use of air streams to remove impurities, as taught in U.S. 3,328,428. However, in preparing pyromellitic dianhydride from conventional octahydroanthracenes, mellophanic dianhydride is formed as a by-product and remains as a contaminate when pyromellitic dianhydride is purified by conventional processes.

It has now been found that crude pyromellitic dianhydride and pyromellitic acid can, by following the process of the present invention, be converted into high purity pyromellitic dianhydride.

SUMMARY OF THE INVENTION

Crude pyromellitic dianhydride or pyromellitic acid, prepared by nitric acid oxidation of octahydroanthracene and having nitrogen-containing compounds and mellophanic acid as impurities is purified by heating the crude product in a closed reaction zone at 300–330° C., to liquefy the crude product and convert any pyromellitic acid to pyromellitic dianhydride, and contacting the liquefied crude with a current of air or inert gas whereby high purity pyromellitic dianhydride is removed from the liquefied crude product, leaving impurities behind, then cooling and collecting the purified solidified pyromellitic dianhydride.

BRIEF DESCRIPTION OF THE DRAWING

The accompanying drawing illustrates, by flow diagram, the process of the present invention.

DETAILED DESCRIPTION

The crude pyromellitic acid or dianhydride that is purified by the present process is prepared by the nitric acid oxidation of octahydroanthracene. Octahydroanthracene, is predominantly sym-octahydroanthracene, but contains minor amounts of octahydrophenanthrene. Oxidation of the hydrogenated product results in the formation of byproduct mellophanic acid from the octahydrophenanthrene impurity. The byproduct mellophanic acid, since it is an isomer of pyromellitic acid, is especially difficult to remove from any crude pyromellitic acid products.

In my process, the crude pyromellitic acid or anhydride, containing mellophanic acid and nitrogen-containing impurities is, in a closed reaction vessel with appropriate inlet and outlet means, heated to a temperature of about 300–330° C. At this temperature range, any pyromellitic acid which is present will be dehydrated to the desired pyromellitic dianhydride. The crude acid may be present in the form of a dihydrate ($C_{10}H_6O_8 \cdot 2H_2O$) or in anhydrous form ($C_{10}H_6O_8$), both of which will be converted to the dianhydride ($C_{10}H_2O_6$).

The minimum temperature of about 300° C. is necessary to convert the crude solid mixture into a liquid state and form a melt suitable for purification according to the present process. Temperatures in excess of about 330° C. should be avoided because of possible decomposition of the melt ingredients and the danger of flash distillation of the melt which would result in insufficient purification. If desired, the acids may be converted to the anhydride prior to the purification step, and the anhydride subsequently heated to the necessary temperature range.

The crude pyromellitic anhydride, at a temperature of 300–330° C., is then contacted with a flow of preheated air or other inert gas, the term inert being used herein to define non-reaction with the pyromellitic dianhydride under the purification conditions. Suitable such gases are air, preferred because of economics, nitrogen, carbon dioxide and the like. The rate of flow of the gas can be widely varied. I have found that a rate of about twelve cubic feet per minute is desirable. About twice this rate can be used before considerable flash distillation occurs, while slower rates extend the time needed for the purification. Any suitable rate may be used provided the rate is not so fast as to cause flash distillation of the melt and defeat the purpose of the purification by carrying impurities over with the purified pyromellitic.

The process is carried out in a closed reaction zone which, of course, results in the presence of superatmospheric pressure in the zone. Pressures of up to about 0.5 atmosphere may be used, with higher pressures only necessitating sophisticated equipment without any apparent benefits to the process.

Significantly, the mellophanic acid present in the melt is not carried over with the purified pyromellitic dianhydride. Under the conditions used herein, the mellophanic acid is carbonized and retained in the melt residue which remains following removal of the pyromellitic dianhydride. Thus, the purification of the pyromellitic dianhydride and its separation from mellophanic acid are simultaneously achieved.

The air or other inert gas is preheated prior to contact with the melt, to a temperature of about 250–330° C. which enables maintenance of the desired purification temperature in the melt. If the gas is much below about 250° C., excessive cooling of the melt could result, interfering with the maintenance of the desired purification temperature of the melt. Too high a temperature could result in superheating of the melt with decomposition or flash distillation resulting. The heated gas can be either passed through the melt or directed over the surface of the melt, the latter being preferred because of the lessened danger of distillation of crude material.

After contacting the melt, the gas stream is cooled and the purified pyromellitic dianhydride collected. A preferred embodiment of the present process is to pass the gas stream following contact with the melt, through a conduit (heated to about 250–330° C.) and then through a porous container, such as a fiber glass bag at cooler temperatures, preferably ambient temperature. The purified pyromellitic dianhydride will be retained by the bag, in solid form, while any moisture from the melt (such as from dehydration of pyromellitic acid) will pass through the porous material along with the inert gas.

EXAMPLE I

A 2.2 liter shaker autoclave having a glass liner was charged with 500 ml. of 45% nitric acid (4.5 moles) and the acid heated to boiling at atmospheric pressure. Octahydroanthracene (60 g., 0.32 mole) containing 95% sym.-isomer, 1% tetrahydroanthracene and 3% octahydrophenanthrane was added a small amount at a time (3 hours) with evolution of oxides of nitrogen. The heat of reaction during the addition was sufficient to maintain the nitric at the boiling point. After the addition of the octahydroanthracene, nitric acid (100 ml. of 45%) was added to make up for evaporation losses. The reaction mixture was heated, with shaking under 250 p.s.i. of oxygen. At 110° C., the reaction became so vigorous that it was necessary to air cool the reactor. The temperature was allowed to rise to 152–158° C. and was maintained at this temperature until the gas pressure remained constant. The pressure was vented from 450 p.s.i. to 320 p.s.i. and oxygen added periodically. The reaction mixture was heated and shaken for 6 hours, to insure complete oxidation. It appeared that the reaction was completed in 45 minutes from the time reaction temperature was reached until the gas pressure that developed remained constant. The pyromellitic acid obtained as a nearly white misty solid was dried on a steam bath together with aqueous rinsings from the liner. The yield of crude pyromellitic acid was 77 g. (yield, 94.5%). A series of such experiments were made to provide sufficient material for purification.

EXAMPLE II

To a one liter, three-neck glass flask, adapted with a gas inlet tube, gas outlet tube and thermocouple, there was charged crude pyromellitic acid (200 g., neut. eq. 68) prepared generally according to the procedure of Example I. The crude pyromellitic acid was heated to 300° C. to convert all of the solids to a liquid melt. Nitrogen at 12 cu. ft./min. was fed above the melt until the flask no longer contained sublimate. The pyromellitic dianhydride was collected in a bag as a white powder. The purification required only a few minutes. The bag was made of fiber glass which permitted moisture to pass through its pores, but retained the crystals of dianhydride. Impurities in the pyromellitic acid were left behind as an ash. Mellophanic acid in the pyromellitic acid, made in the process from the oxidation of octahydrophenanthrene as a contaminant in the octahydroanthracene, was also separated from the pyromellitic dianhydride in the purification. Mellophanic acid is not converted to the anhydride under the conditions used to vaporize pyromellitic dianhydride, but is carbonized instead. In this experiment, 8 g. of residue were obtained. The conversion of pyromellitic acid to pyromellitic dianhydride calculated on the basis of the residue was approximately 95%. Analysis of the slightly tan product showed 93.1% pyromellitic dianhydride and 6% pyromellitic acid.

EXAMPLE III

The product of Example II was re-purified using the procedure described in Example II to give 2.0 grams of residue and a 94% yield of white pyromellitic dianhydride (based on the starting acid in Example II). Analysis of the product showed 98.8% pyromellitic anhydride and 0.8% pyromellitic acid.

EXAMPLE IV

Crude pyromellitic acid, prepared generally as in Example I, was converted to dianhydride by heating in trichlorobenzene at reflux until the water of dehydration was removed. A 93% yield of dianhydride, based on pyromellitic acid, resulted. The pyromellitic dianhydride was purified according to the procedures of Example II and gave an 87% yield, based on the starting acid of white product of 99.5% purity with 0.4% pyromellitic acid present.

EXAMPLE V

In order to demonstrate the importance of removing the pyromellitic dianhydride from any mellophanic dianhydride in the crude, by carbonization of the mellophanic, the following experiment was made to show the difficulty of separating mellophanic from pyromellitic dianhydride by a distillation process. To a distillation flask, there was charged 39.6 g. of 50:50 mixture of pyromellitic dianhydride and mellophanic dianhydride. The dianhydrides were heated and distilled as follows:

| | Time (min.) | Temp. ° C. | Vacuum MM./Hg. |
|---|---|---|---|
| Start | 0 | 25 | 1.1 |
| Reflux, some sublimate | 45 | 245 | 0.4 |
| Sublimate | 65 | 290 | 0.3 |
| Liquid melt | 70 | 314 | 1.8 |
| Dry flask—end point | 110 | 258 | 0.5 |

There was recovered 38.5 g. (99.9%) of distillate, with the mellophanic apparently being first removed. The distillate was analyzed and shown to be a mixture of pyromellitic and mellophanic dianhydrides.

What is claimed is:

1. A process for preparing high purity pyromellitic dianhydride from crude pyromellitic dianhydride or acid, said crude containing mellophanic acid and nitrogen-containing impurities therein and being prepared by nitric acid oxdation of octahydroanthracene containing minor amounts of octahydrophenanthrene comprising:
    (a) heating said crude pyromellitic dianhydride or acid to a temperature of 300–330° C. in a closed reaction zone to liquefy said crude and form a melt and convert any pyromellitic acid in said crude to the anhydride;
    (b) contacting said melt in said zone with a current of air or other inert gas, said gas being at a temperature of 250–330° C., whereby high purity pyromellitic dianhydride is removed from the melt by said current and impurities are retained by said melt; and
    (c) collecting said high purity pyromellitic dianhydride.

2. A process according to claim 1 wherein said pyromellitic acid is converted to pyromellitic dianhydride prior to said liquefication to form a melt.

3. A process according to claim 1 wherein said melt is contacted with a current of air.

4. A process according to claim 1 wherein said inert gas is nitrogen.

5. A process according to claim 1 wherein said high purity pyromellitic dianhydride is collected by passing said current following said contact, through a porous container at ambient temperature whereby said current flows through said container and said high purity pyromellitic dianhydride is retained in said container.

6. In a process for preparing highly pure pyromellitic dianhydride by the nitric acid oxidation of sym-octahydroanthracene, containing octahydrophenanthrene as an impurity, to produce pyromellitic acid, the nitric acid oxidation product containing mellophanic acid and nitrogen-containing impurities, and dehydrating said pyromellitic acid to crude pyromellitic dianhydride, the improvement comprising removing the mellophanic acid and nitrogen-containing impurities from said pyromellitic dianhydride by heating said crude pyromellitic dianhydride to a temperature of 300–330° C. in a closed reaction zone to liquefy said crude and form a melt;
  contacting said melt in said zone, with a current of air or other inert gas, said gas being at a temperature of 250–330° C. whereby high purity pyromellitic dianhydride is removed from the melt by said current and said impurities are retained by said melt; and
  collecting said highly pure pyromellitic dianhydride.

7. Process for separating pyromellitic dianhydride from a mixture of pyromellitic dianhydride and mellophanic acid comprising heating said mixture to a temperature of 300–330° C. in a closed reaction zone to liquefy said mixture and form a melt;
  contacting said melt in said zone with a current of air or other inert gas, said gas being at a temperature of 250–330° C. whereby said pyromellitic dianhydride is removed from said melt by said current and said mellophanic acid remains in said melt.

8. Process for preparing high purity pyromellitic dianhydride from a mixture of pyromellitic acid and mellophanic acid comprising heating said mixture to a temperature of 300–330° C. in a closed reaction zone to liquefy said mixture to form a melt, while converting said pyromellitic acid to pyromellitic dianhydride;
  contacting said melt in said zone with a current of air or other inert gas, said gas being at a temperature of 250–330° C., whereby said pyromellitic dianhydride is removed from said melt by said current and said mellophanic acid remains in said melt.

References Cited
UNITED STATES PATENTS 2,578,326  12/1951  Toland _____ 260—346.3
2,829,155  4/1958  Muench et al. _____ 260—706

OTHER REFERENCES

Clar-Chemische Berichte, 1942, vol. 75, pp. 1330, 1335–1336.

Handbook of Chemistry and Physics, 43rd ed., 1961–62, Cleveland, Ohio—Chemical Rubber Publishing Co., pp. 1086–7.

ALEX MAZEL, Primary Examiner

B. I. DENTZ, Assistant Examiner